US006662559B1

(12) United States Patent
Cook

(10) Patent No.: US 6,662,559 B1
(45) Date of Patent: Dec. 16, 2003

(54) HYDRAULIC ACTUATOR

(75) Inventor: Gregory D. Cook, Duncan, OK (US)

(73) Assignee: Cook Manufacturing Corporation, Duncan, OK (US)

( * ) Notice: Subject to any disclaimer, the term of this patent is extended or adjusted under 35 U.S.C. 154(b) by 0 days.

(21) Appl. No.: 10/157,334

(22) Filed: May 28, 2002

Related U.S. Application Data

(63) Continuation of application No. 09/641,586, filed on Aug. 18, 2000, now abandoned.

(51) Int. Cl.[7] .......................... F16D 31/02; B63H 20/08

(52) U.S. Cl. .............................. 60/475; 60/478; 440/61

(58) Field of Search .......................... 60/325, 473, 475, 60/476, 477, 478; 440/61

(56) References Cited

U.S. PATENT DOCUMENTS 2,679,727 A * 6/1954 Mcleod ....................... 60/475
3,473,325 A * 10/1969 Vargo .......................... 440/61
4,037,520 A 7/1977 Jakob
4,482,330 A 11/1984 Cook
5,144,801 A * 9/1992 Scanderbeg et al. .......... 60/475
5,181,835 A 1/1993 Cook
6,213,822 B1 * 4/2001 Saito et al. ................... 440/61
6,332,817 B1 * 12/2001 Nakamura ................... 440/61

* cited by examiner

*Primary Examiner*—Edward K. Look
*Assistant Examiner*—Thomas E. Lazo
(74) *Attorney, Agent, or Firm*—Fellers, Snider, et al.; Bill D. McCarthy

(57) ABSTRACT

The present invention provides a hydraulic actuator suitable for use in marine and other harsh environments. In the presently preferred embodiment, the hydraulic actuator includes a motor that is coupled to a pump assembly that is configured to displace hydraulic fluid. The hydraulic actuator also includes a cylinder bore that has an upper chamber and a lower chamber which are separated by a movable piston member. Pressure actuated valves are used to regulate the flow of high pressure hydraulic fluid to the cylinder bore. The pressure actuated valves are actuated in response to pressure generated by the pump assembly.

6 Claims, 7 Drawing Sheets

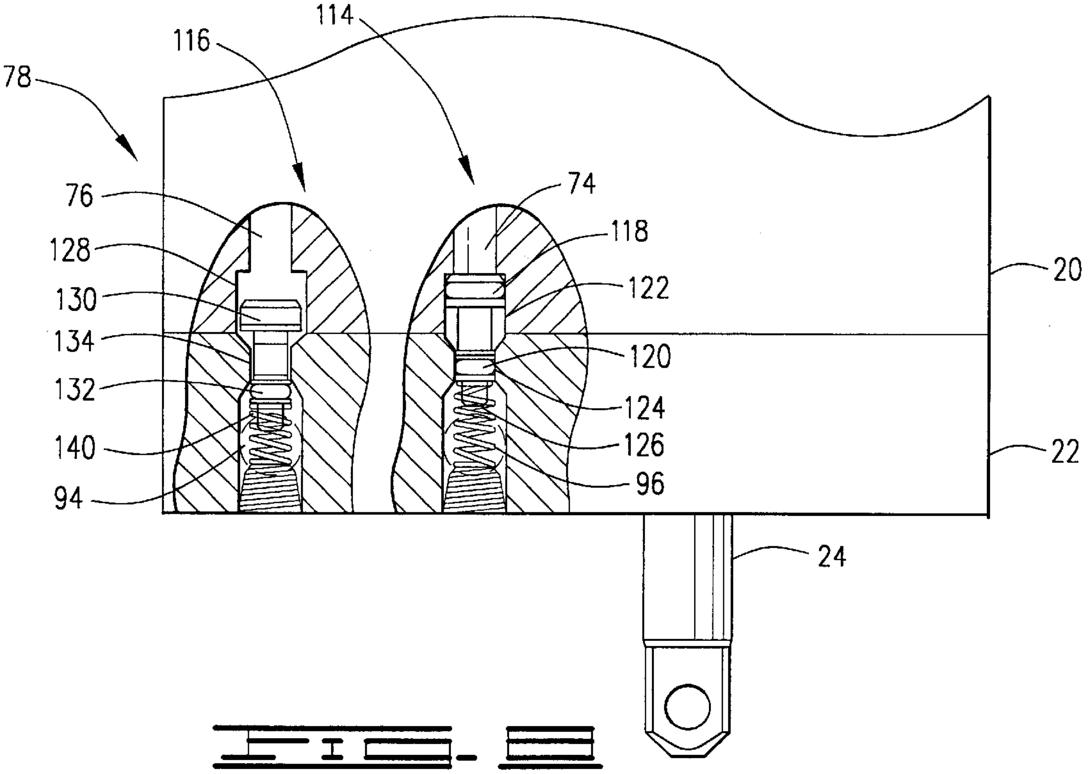
114
116
78
76
74
118
128
130
122
134
120
132
124
140
126
94
96
20
22
24
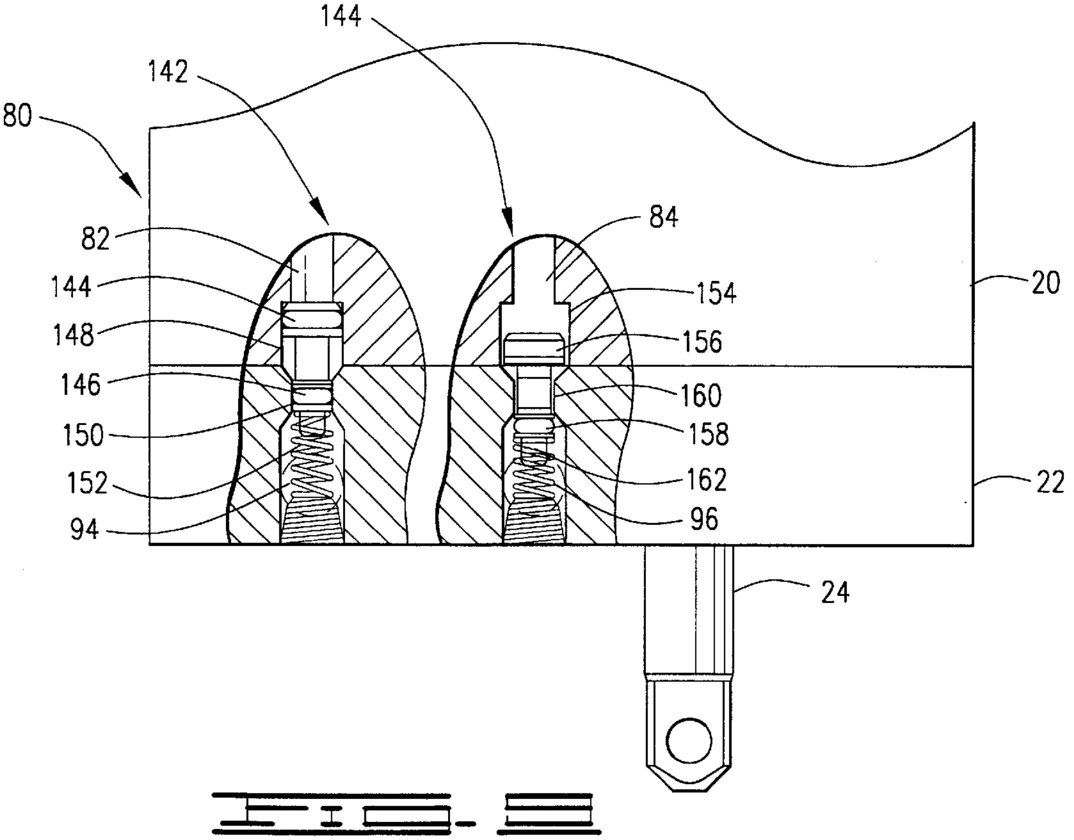
144
142
80
84
82
144
154
148
156
20
146
160
150
158
152
162
94
96
22
24

HYDRAULIC ACTUATOR

RELATED APPLICATIONS

This application is a continuation application of U.S. Non-Provisional Application Ser. No. 09/641,586 filed Aug. 18, 2000 now abandoned.

FIELD OF INVENTION

The present invention relates generally to the field of hydraulic pumps, and in particular but not by way of limitation, to a hydraulic actuator used in a marine environment in conjunction with an outboard motor.

BACKGROUND OF INVENTION

The need for portable lifting power is widespread. Batteries provide a good source for power but the driven devices can be complicated, cumbersome and inadequate. To date, the most popular systems are driven by direct current (DC) electric motors. These motors generally drive screw type devices or hydraulic type devices. Screw type devices have proven adequate for some light duty applications but fall short when long-term rugged service is required. Hydraulic devices are inherently more suited to harsh service but tend to be more complicated and expensive.

Most hydraulic lifting systems consist of several separate components such as a motor, hydraulic pump, hydraulic fluid reservoir, hydraulic lines, assorted fittings, electric control solenoids and a hydraulic cylinder. These systems are functional but impractical for many portable applications, since each component must be mounted independently to operate as a unit. Space and weight restrictions are problems since each component must have a housing or enclosure.

Harsh environments also pose problems for these systems. Most hydraulic systems require use of breather tubes or vents that allow contaminants such as water, dirt and other foreign objects, to enter the system and such contamination often leads to component failure. The components are usually made from ferrous materials, making the components susceptible to corrosion.

Thus, prior art hydraulic systems have been found to be undesirable for marine applications.

SUMMARY OF INVENTION

The present invention provides a hydraulic actuator suitable for use in marine and other harsh environments. In the presently preferred embodiment, the hydraulic actuator includes a motor that is configured to operate in a first or second direction. A pump assembly is coupled to the motor and is configured to pressurize and displace hydraulic fluid. The hydraulic actuator also includes a cylinder bore that has an upper chamber and a lower chamber which are separated by a movable piston member. A first plurality of pressure actuated valves are used to regulate the flow of high pressure hydraulic fluid to the upper chamber and low pressure fluid from the lower chamber. The first plurality of pressure actuated valves are actuated in response to pressure generated by the pump assembly when the motor is operating in the first direction. A second plurality of pressure actuated valves are used to regulate the flow of high pressure hydraulic fluid to the lower chamber and low pressure fluid from the upper chamber. The second plurality of pressure actuated valves are actuated in response to pressure generated by the pump assembly when the motor is operating in the second direction.

Other objects, advantages and features of the present invention will become clear from the following detailed description and drawings when read in conjunction with the claims.

BRIEF DESCRIPTION OF DRAWING

FIG. 8 is a partial cutaway view of a portion of the left side of the hydraulic actuator of FIG. 1 showing the valves of the extend activation system.

FIG. 9 is a partial cutaway view of a portion of the left side of the hydraulic actuator of FIG. 1 showing the valves of the retract activation system.

DESCRIPTION

Figure 1:
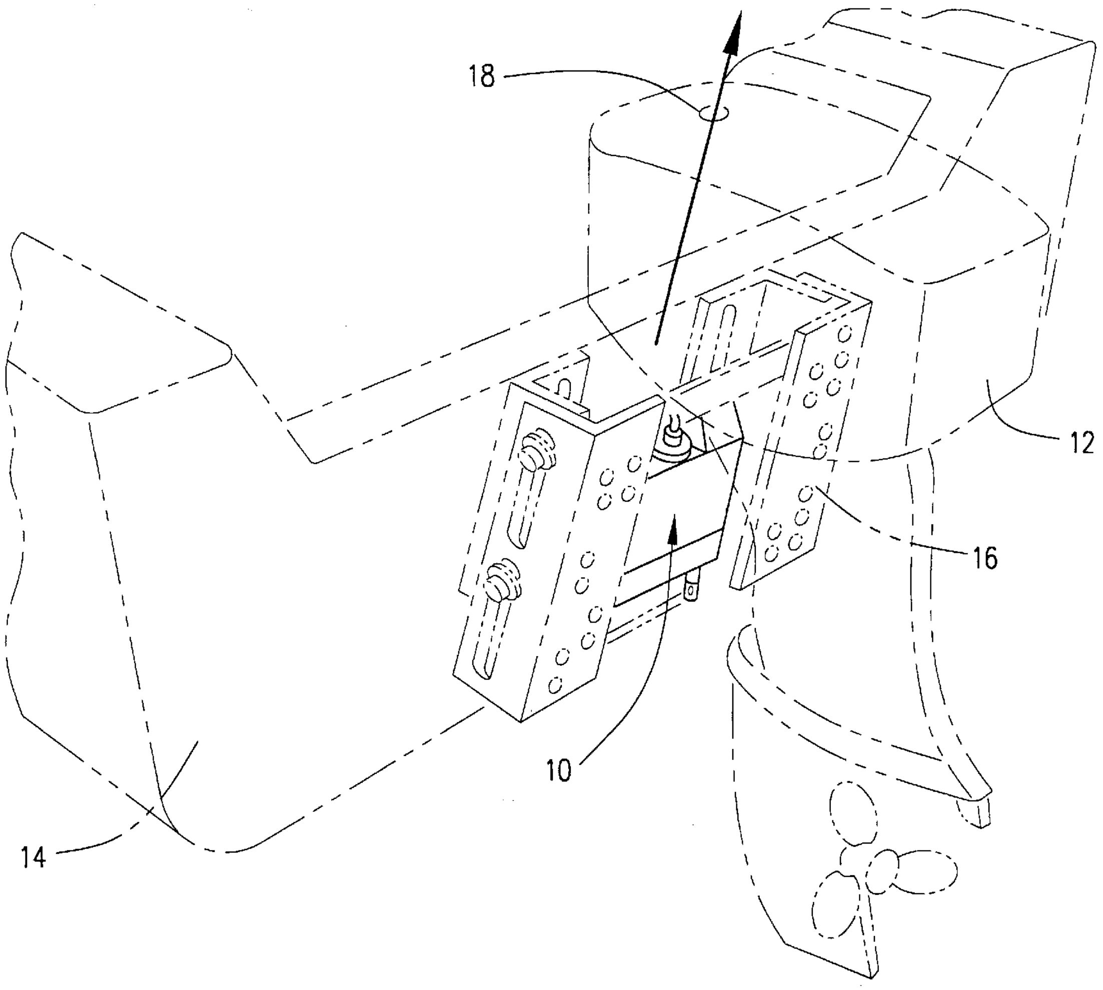
FIG. 1 is a perspective view of a hydraulic actuator of the present invention showing the relative positions of the actuator, a mounting apparatus attached to a transom of a boat upon which the actuator is mounted, and a motor that is mounted on the mounting apparatus.

Referring to the drawings in general and particularly to FIG. 1, shown therein is a hydraulic actuator 10 constructed in accordance with the present invention. While the present invention will be described in relation to the embodiment shown in the appended drawings, it will be understood that the present invention can be adapted to other embodiments.

The hydraulic actuator 10 shown in FIG. 1 is connected to an outboard motor 12 that is pivotally mounted to a boat 14 via a transom bracket 16 such as that taught in my U.S. Pat. No. 4,482,330. The boat 14, outboard motor 12, and transom bracket 16 have been indicated in dashed lines in FIG. 1 to indicate the positioning of the hydraulic actuator 10 on the boat 14 and the positioning of the outboard motor 12 and transom bracket 16 in relation to the hydraulic actuator 10. As shown in FIG. 1, the transom bracket 16 is mounted on the boat 14 such that the selected line of movement (indicated by arrow 18) is orientated relative to the boat 14 for vertical movement of the outboard motor 12 thereon.

The parts for the hydraulic actuator 10 are designed such that they can be manufactured from stock materials using standard machine tools. Because no special castings are necessary, small lot production is feasible. This construction is possible due to the novel valve system that controls fluid flow and direction without external electric solenoids.

Figure 2:
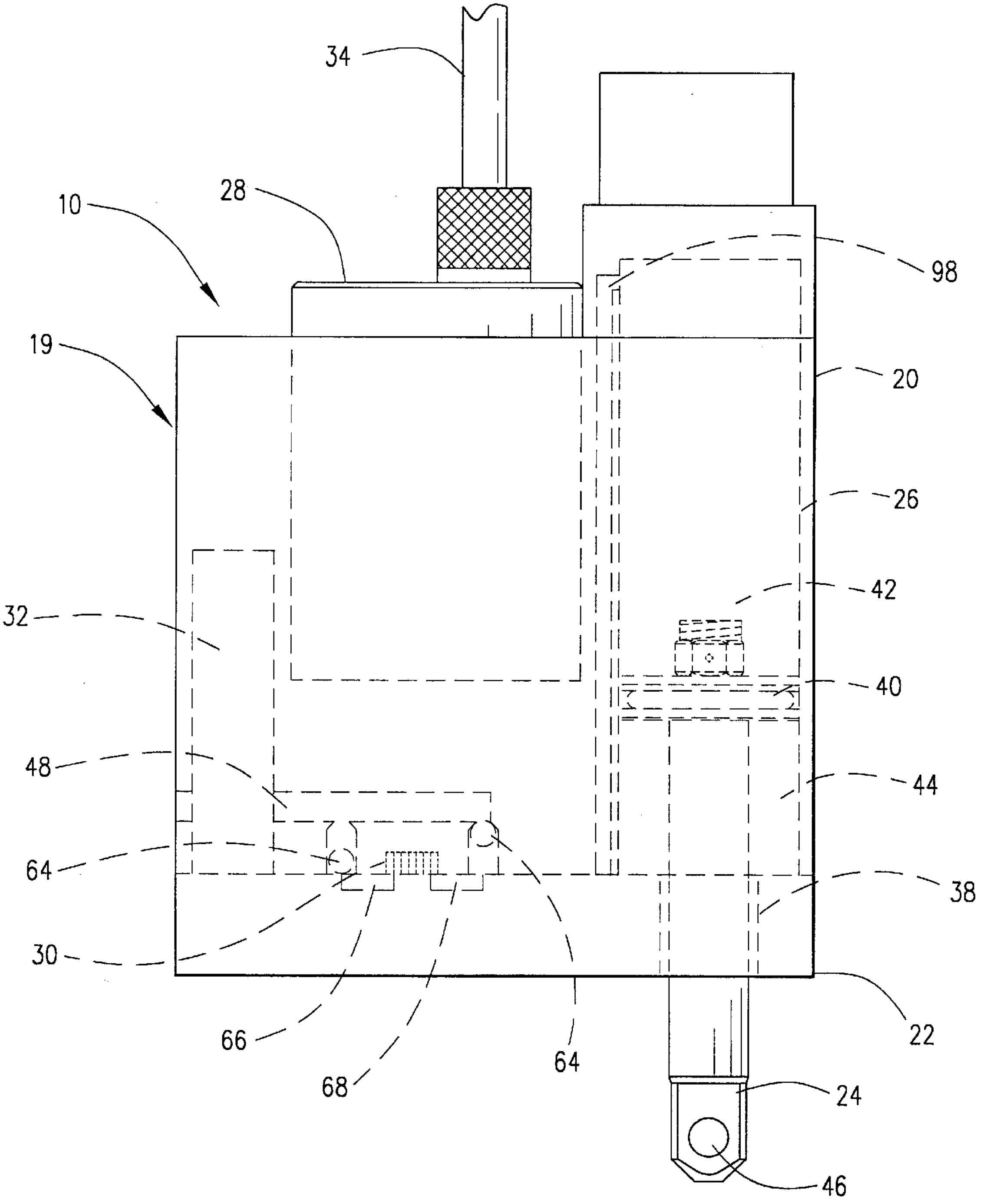
FIG. 2 is an elevational, front view of the hydraulic actuator of FIG. 1

As shown in FIG. 2, the hydraulic actuator 10 has an actuator body 19 made up of a main body 20 and a port body 22. When connected, the main body 20 and the port body 22 contain a number of fluid conduits. These conduits direct hydraulic fluid to and from both ends of a rod 24 that is extended or retracted as needed. The rod 24 is disposed in a cylinder bore 26, shown in dashed lines, that passes through the main body 20. Also shown in dashed lines is a pump motor 28, pump assembly 30 and reservoir 32 that are disposed in the main body 20. Preferably, the reservoir 32 is used to store incompressible hydraulic fluid. The motor 28 is connected to a power cable 34 that can be attached to a 12 volt battery or other energy source.

Figure 3:
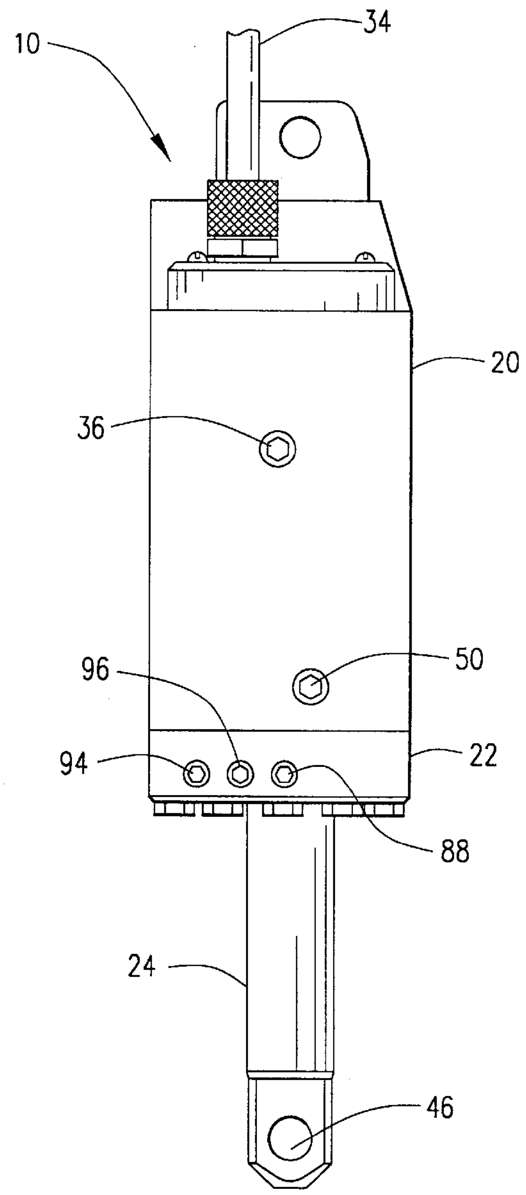
FIG. 3 is a left side view of the hydraulic actuator of FIG. 1.
Figure 4:
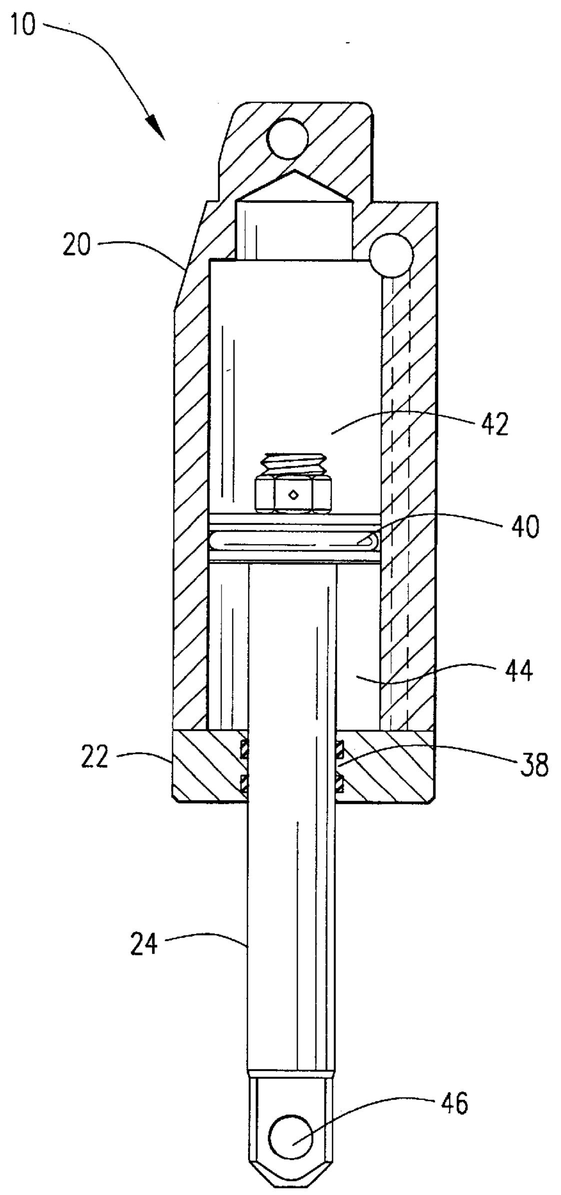
FIG. 4 is a right side, cross-section view of the hydraulic actuator of FIG. 1.

FIGS. 3 and 4 show elevational views of the left and right side of the actuator 10, respectively. As shown in FIG. 3, the body 20 includes a fill port 36 that is used to fill the reservoir 32. Because the reservoir level is at the fill port 36 when full, the fill port 36 can also be used to the check the volume of the hydraulic fluid in the actuator 10. FIG. 4 illustrates (in partial cross section) the relationship between the cylinder bore 26 and rod 24. The rod 24 penetrates the port body 22 through the opening 38 and attaches to a reciprocating piston member 40 in the cylinder bore 26. Cylinder bore 26 has two areas, an upper chamber 42 and a lower chamber 44. A hole 46 on the rod 24 permits other devices to be connected to the rod member 24 for effective movement.

Figure 5:
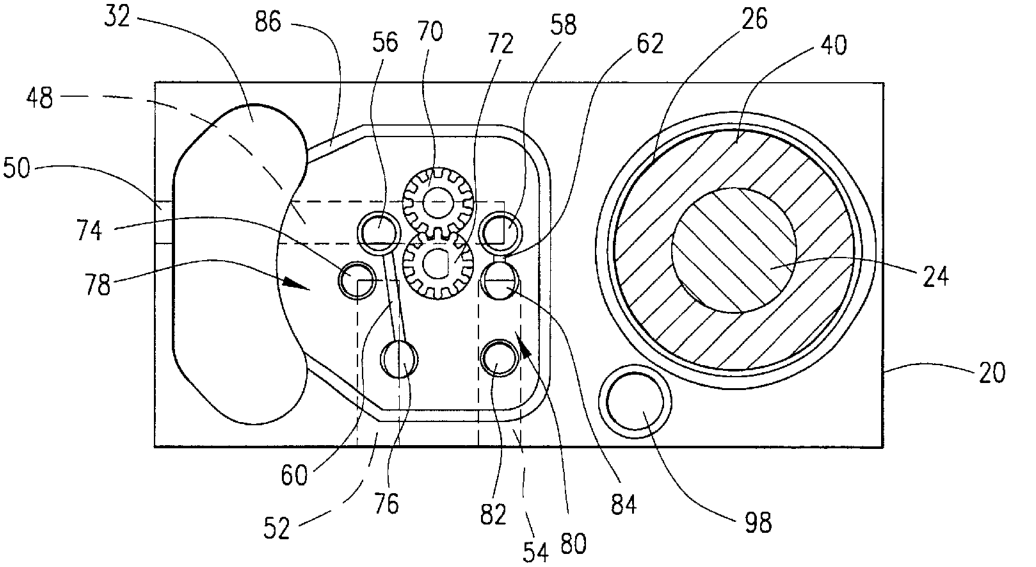
FIG. 5 is a plan view of the lower surface of the main body of the hydraulic actuator.

Turning now to FIG. 5, shown therein is a plan view of the bottom of the main body 20. The first of three passageways in the main body 20 is a main longitudinal passageway 48 (shown in dashed lines) which runs through the main body 20 from the reservoir 32 toward the cylinder bore 26. The main longitudinal passageway 48 does not intersect the cylinder bore 26. A port 50 provides access to the main longitudinal passageway 48 and can act as a drain hole.

First and second lateral passageways 52, 58 also run through the main body 20 and are perpendicular to the main longitudinal passageway 48. The first and second lateral passageways 52, 54 are in communication with the longitudinal passageway 48 through main-body bores 56, 58, respectively, and first and second channels 60, 62, respectively. First and second channels 60, 62 are defined by mating grooves at the interface of the bottom surface of the main body member 20 and top surface of the port body member 22.

As shown in FIGS. 2 and 5, the first main body bore 56 and the second main body bore 58 of the main body 20 each have a ball check valve 64. Two indentures in the port body 22 from two pump canals 66, 68 when the port body 22 is joined to the main body 20. The pump assembly 30 includes two gears, and idler gear 70 and a drive gear 72, that are disposed adjacent to, and in fluid communication with, pump canals 66, 68. The idler gear 70 and drive gear 72, are powered by the pump motor 28, and work together to produce a pressure reduction in one of the two main-body bores 56, 58.

Each ball check valve 64 will permit fluid to flow into the pump canals 66, 68 from the reservoir 32 but will close in response to increased fluid pressure in the pump canals 66, 68. Each ball check valve 64 has a ball that is driven by pressure against a seat (not numerically designated in the drawings) in each of the main body bores 56, 58. A spring (not shown in the drawings) can be used to displace the ball from the seat in the absence of such pressure. Thus each ball check valve 64 is open until hydraulic fluid pressure forces the ball to close the valve. These are valves similar to those taught in the Applicant's U.S. Pat. No. 5,181,835 but differ as designated by this invention. U.S. Pat. No. 5,181,835 is hereby incorporated by reference.

The two main body bores 56, 58 are both in fluid communication with the pump assembly 30, the reservoir 32 and each other so that fluid can flow from the first main body bore 56 to the second main body bore 58 and vice versa. The fluid flow from the open check valve 64 in the first main body bore 56 can close the second main body bore 58 check valve 64 and cause the pressure to rise. As such, during the operation of the pump assembly 30, only one check valve 64 is open. The closure of the check valves 64 is dictated by the direction in which the pump assembly 30 operates.

As shown in FIG. 5, an active bore 74 and a passive bore 76 intercept the first lateral passageway 52 and are included in an extend activation system 78. The extend activation system 78 is responsible for extending the rod 24 from a retracted position. Similarly, a retract activation system 80 includes an active bore 82 and a passive bore 84, which intercept the second lateral passageway 54. The retract activation system 80 is responsible for retracting the rod 24 from an extended position. The independent operation of the extend and retract activation systems 78, 80 is automatically controlled by the direction in which the pump assembly 30 is operated.

Also shown in FIG. 5 is a return channel 86 that terminates on both ends at the reservoir 32. The return channel 86 encapsulates the extend and retract activation systems 78, 80 and pump assembly 30. As such, any hydraulic fluid that escapes its intended conduit at the interface of the main body 20 and port body 22 is captured in the return channel 86 and delivered to the reservoir 32. A channel 87 connects the active bore 82 of the retract activation system 80 with the return channel 86.

Figure 6:
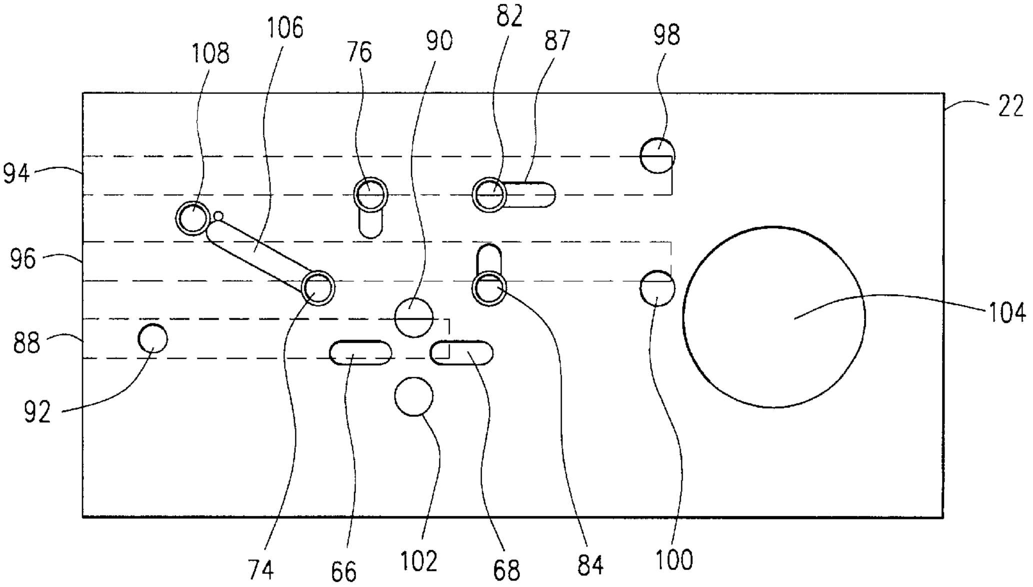
FIG. 6 is a view of the upper surface of the port body of the hydraulic actuator.

Turning to FIG. 6, shown therein is a plan view of the top surface of the port body 22. The port body 22 has three port passageways that run through the port body 22. A pump passageway 88 is used to connect a pump vent 90 with the reservoir 32. During operation of the pump assembly 30, excessive pressure can accumulate under the idler and drive gears 70, 72 and adversely affect the performance of the pump assembly 30. Pump vent 90 is positioned below the idler gear 70 and relieves such pressure by returning the accumulated fluid to the reservoir 32 through pump passageway 88 and bore 92.

An upper cylinder passageway 94 and a lower cylinder passageway 96 are in communication with the upper chamber 42 and lower chamber 44 of the cylinder bore 26, respectively. The upper cylinder passageway 94 is connected to the cylinder bore 26 via bore 98 which extends from the upper cylinder passageway 94 through the port body 22 and main body 20. The lower cylinder passageway 96 is connected to the lower chamber 44 through bore 100. Indentation 102 receives the shaft of the idler gear 70. The port body 22 also has an opening 104 to accept the rod member 24.

FIG. 6 also shows a number of other indentations that combine with the main body 20 to form fluid passageways. Channel 106 connects active bore 74 with the reservoir 32 via drain bore 108. A drain plug (not shown) can be inserted into drain bore 108 from the bottom of the port body 22 and removed when it is necessary to drain the hydraulic fluid. Channel 110 connects the active bore 82 with the reservoir 32 through return channel 86.

Figure 7:
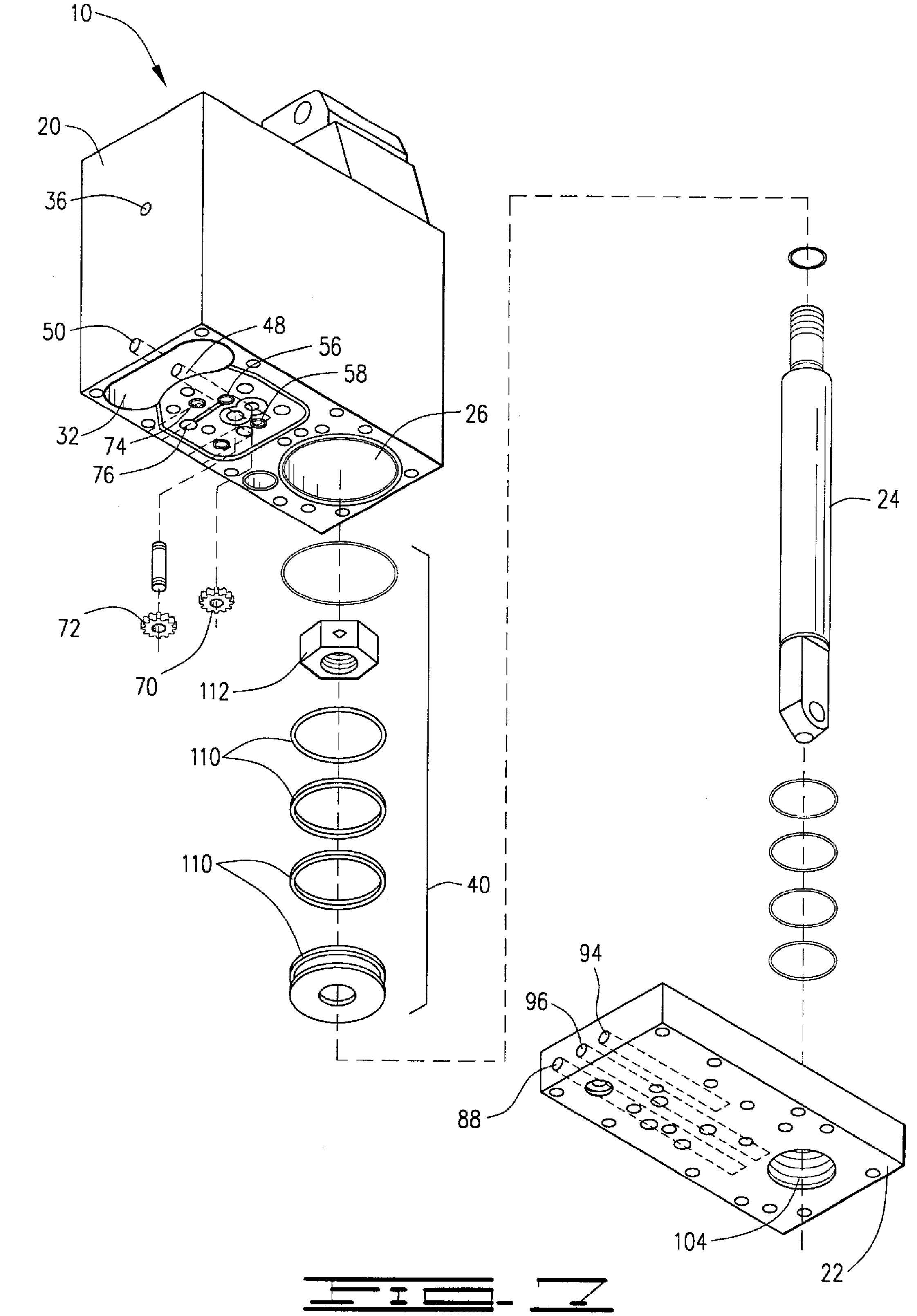
FIG. 7 is an exploded view of the hydraulic actuator of FIG. 1.

FIG. 7 is an exploded view of the hydraulic actuator 10, which demonstrates the connection between the main body 20, the port body 22 and the rod 24. As shown, the piston member 40 includes various washers and piston rings 110 and a nut 112. In the preferred embodiment, the port body 22 is attached to the main body 20 through use of a plurality of fasteners (not shown) that extend through attachment bores 114 from below the port body 22 into the main body 20. Suitable plugs can be used to cover any openings in the actuator 10.

Turning now to FIG. 8, shown therein is a partial left side elevational view of the hydraulic actuator 10 with a cutaway cross-sectional view of the preferred structure of the valve assemblies used by the extend activation system 78. The extend activation system 78 includes an active valve assembly 114 housed in active bore 74 and a passive valve assembly 116 housed in passive bore 76.

The active valve assembly 114 includes a valve head 118 and a valve stop 120. The valve head 118 fits tightly in a head seat 122 in the active bore 74 to prevent the passage of hydraulic fluid around the valve head 118. While closed, the valve stop 120 fits tightly in a stop seat 124 (as shown), thereby prohibiting the movement of fluid across the stop seat 124. A compression spring 126 is used to hold the active valve assembly 114 in the closed position.

The application of pressurized hydraulic fluid to the top surface of the valve head 118 forces the active valve assembly 114 downward, thereby unseating the valve stop 120. When open, the active valve assembly 114 permits the flow of hydraulic fluid from lower cylinder passageway 96 across the stop seat 124 to the bottom of the valve head 118. The hydraulic fluid is then conducted through a channel 106 formed at the interface of the main body 20 and port body 22.

Continuing with FIG. 8, unlike the active bore 74, the passive bore 76 includes an elliptical head seating 128 around a valve head 130. The elliptical head seating 128 permits the passage of hydraulic fluid across the valve head 130 in the passive valve assembly 116. While closed, a valve stop 132 fits tightly in a stop seat 134, thereby prohibiting the movement of fluid across the stop seat 138. A compression spring 140 is used to hold the passive valve assembly 116 in the closed position.

The initial application of pressurized hydraulic fluid between the valve stop 132 and valve head 130 of the passive valve assembly 116 forces hydraulic fluid up and around the valve head 130. It will be noted that the elliptical head seat 128 permits an equalization of pressure around the valve head 130 of the passive valve assembly 116. However, when sufficient pressure generates above the valve stop 132, the passive valve assembly 116 is forced downward into an open position (as shown). In the open position, high pressure hydraulic fluid is allowed to pass through the stop seat 134 into the upper cylinder passageway 94 in the port body 22.

Turning now to FIG. 9, shown therein is a partial left side elevational view of the hydraulic actuator 10 with a cutaway cross-sectional view of the preferred structure of the valve assemblies used by the retract activation system 80. The retract activation system 80 includes an active valve assembly 142 housed in active bore 82 and a passive valve assembly 144 housed in passive bore 84

Like the active valve assembly 114, the active valve assembly 142 includes a valve head 144 and a valve stop 146. The valve head 144 fits tightly in a head seat 148 in the active bore 82 to prevent the passage of hydraulic fluid around the valve head 144. While closed, the valve stop 146 fits tightly in a stop seat 150 (as shown), thereby prohibiting the movement of fluid across the stop seat 150. A compression spring 152 is used to hold the active valve assembly 142 in the closed position.

The application of pressurized hydraulic fluid to the top surface of the valve head 144 forces the active valve assembly 142 downward, thereby unseating the valve stop 146. When open, the active valve assembly 142 permits the flow of hydraulic fluid from upper cylinder passageway 94 across the stop seat 150 to the bottom of the valve head 144. The hydraulic fluid is then conducted through the return channel 110 at the interface of the main body 20 and port body 22.

Continuing with FIG. 9, the passive valve assembly 144 is housed in the passive bore 76 and includes an elliptical head seat 154 around a valve head 156. The elliptical head seat 154 permits the passage of hydraulic fluid across the valve head 156 in the passive valve assembly 144. While closed, a valve stop 158 fits tightly in a stop seat 160, thereby prohibiting the movement of fluid across the stop seat 160. A compression spring 162 is used to hold the passive valve assembly 144 in the closed position.

The initial application of pressurized hydraulic fluid between the valve stop 158 and valve head 156 of the passive valve assembly 144 forces hydraulic fluid up and around the valve head 156. It will be noted that the elliptical head seat 154 permits an equalization of pressure around the valve head 156 of the passive valve assembly 144. However, when sufficient pressure generates above the valve stop 158, the passive valve assembly 144 is forced downward into an open position (as shown). In the open position, high pressure hydraulic fluid is allowed to pass through the stop seat 160 into the lower cylinder passageway 96 in the port body 22.

EXTEND OPERATION

Referring to the drawings and to FIG. 2 in particular, shown is the hydraulic actuator 10. Applying voltage from a source, through the power connection 34 drives the pump assembly 30 in one direction and if the polarity is reversed in the opposite direction. To extend the rod 24, voltage is applied such that the pump assembly drive gear 72 rotates in a counterclockwise direction, when viewed from below. The cooperative rotation of the drive gear 72 and idler gear 70 positively displaces hydraulic fluid present in the pump canals 66, 68. This creates a pressure reduction, which causes fluid to be withdrawn from reservoir 32 through passageway 48 by bypassing the ball check valve 64 in bore 58. The transfer of fluid from bore 58 to bore 56 through the pump assembly 30 increases pressure against ball check valve 64 of bore 56 causing the ball check valve 64 to close.

Figure 10:
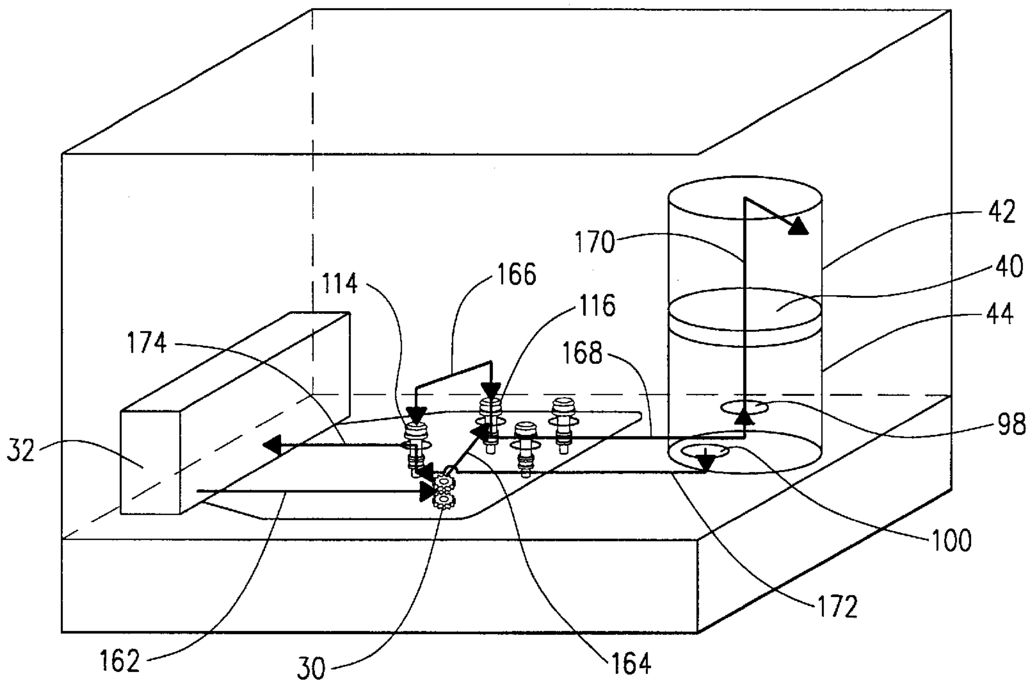
FIG. 10 is a functional schematic showing the fluid paths during the extend operation.

Turning now to FIG. 10, shown therein is a functional schematic of the extend operation. Path 162 represents the fluid travel from the reservoir 32, across the ball check valve 64 in main body bore 58 to the pump assembly 30. High pressure fluid is then pumped along first channel 60 (path 164) from the pump assembly 30 to passive valve assembly 116 in passive bore 76. The high pressure fluid travels around the head seat (not numerically designated) of the passive valve assembly 116 into first lateral passageway 52 (path 166) and against the valve head 118 (see FIG. 2) of the active valve assembly 114 in the active bore 74 (path 168). When the force exerted by the pressurized fluid on the valve head 118 exceeds the force exerted by the compression spring 126, the active valve assembly 114 opens.

At this stage in the extend operation, the pressure of the hydraulic fluid above the valve head 118 of the active valve assembly 114, in the first lateral passageway 52 and around the valve head of the passive valve assembly 116 is substantially equal. As the pump assembly 30 continues to displace hydraulic fluid, the pressure in these areas increases until the force exerted by the hydraulic fluid on the top of the valve stop of the passive valve assembly 116 exceeds the force exerted by the compression spring, thereby forcing the passive valve assembly 116 downward into an open position. When the passive valve assembly 114 opens, high pressure fluid travels down passive bore 76 into upper cylinder passageway 94 (path 168), up bore 98 and into the upper chamber 42 (path 170).

The introduction of high pressure fluid into the upper chamber 42 forces the piston 40 and rod 24 down the cylinder bore 26. As such, any hydraulic fluid remaining in the lower chamber 44 is evacuated through bore 100 into the lower cylinder passageway 96 (path 172). The low pressure return is conducted through the lower cylinder passageway 96, up the active bore 74 and across the open active valve assembly 114. Generally, the presence of low pressure returning fluid will not close the active valve assembly 114. The low pressure fluid is returned to the reservoir 32 from the active bore 74 across channel 106 at the interface of the main body 20 and port body 22 (path 174).

At the extent of the piston stroke, the pressure in the upper chamber 42 may equalize with the pressure exerted against the passive valve assembly 116, allowing the spring to return the passive valve assembly 116 to a closed position. If excess pressure then accumulates around idler and drive gears 70, 72 of the pump assembly 30, hydraulic fluid can be vented through vent hole 90 to the reservoir 32 through pump passageway 88.

RETRACT OPERATION

The rod member 24 is retracted by reversing the polarity of voltage applied to the pump motor 28, thus causing the drive gear 72 to rotate in a clockwise direction, when viewed from below. The idler gear 70, which is meshed with the drive gear 72, then rotates counterclockwise driving the positive displacement gear pump assembly 30. This creates a pressure reduction, which causes fluid to be withdrawn from reservoir 32 through passageway 48 and bore 56 by passing the open ball check valve 64.

The transfer of fluid from bore 56 to bore 58 through the pump assembly increases the pressure against ball check valve 64 of bore 58 causing the ball check valve 64 to close.

Figure 11:
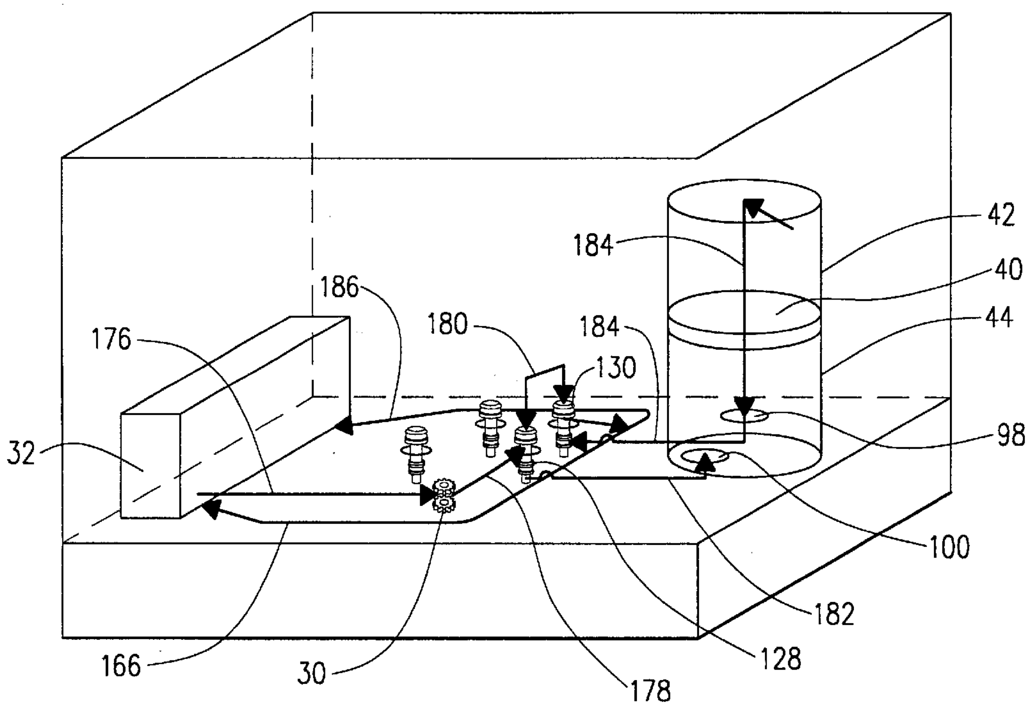
FIG. 11 is a functional schematic showing the fluid paths during the retract operation.

Turning now to FIG. 11, shown therein is a functional schematic of the retract operation. Path 176 represents the fluid travel from the reservoir 32, across the ball check valve 64 in main body bore 56 to the pump assembly 30. High pressure fluid is then pumped along second channel 62 (path 178) from the pump assembly 30 to passive valve assembly 128 in passive bore 84. The high pressure fluid travels around the head seat 132 of the passive valve assembly 128 (see FIG. 9) into the second lateral passageway 54 (path 180) and against the valve head of the active valve assembly 130 in the active bore 82. When the force exerted by the pressurized fluid on the valve head of the active valve assembly 130 exceeds the force exerted by the compression spring, the active valve assembly 130 opens.

At this stage in the retract operation, the pressure of the hydraulic fluid is in equilibrium above the valve head of the active valve assembly 130, in the second lateral passageway 54 and around the valve head 134 of the passive valve assembly 128. As the pump assembly 30 continues to displace hydraulic fluid, the pressure in these areas increases until the force exerted by the hydraulic fluid on the top of the valve stop 136 exceeds the force exerted by the spring 140, thereby forcing the passive valve assembly 128 down into an open position. When the passive valve assembly 128 opens, high pressure fluid travels down passive bore 84 into the lower cylinder passageway 96, up bore 100 and into the lower chamber 44 (path 182).

The introduction of high pressure fluid into the lower chamber 44 forces the piston 40 and rod 24 up the cylinder bore 26. As such, any hydraulic fluid remaining in the upper chamber 42 is evacuated through bore 98 into the upper cylinder passageway 94 (path 184). The low pressure return is conducted through the upper cylinder passage way 94, up the active bore 82 and across the open active valve assembly 130. The low pressure fluid is returned to the reservoir 32 from the active bore 82 across channel 87 to the return channel 86 at the interface of the main body 20 and port body 22 (path 186).

When the rod side chamber has reached its maximum volume, the pressure in the rod side chamber 42 may equalize with the pressure exerted against the passive valve assembly 128, allowing the spring 140 to return the passive valve assembly 128 to a closed position. If excess pressure then accumulates around idler and drive gears 70, 72 of the pump assembly 30, hydraulic fluid can be vented through vent hole 90 to the reservoir through pump passageway 88.

STATIC OPERATION

With the rod member 24 at any position and common voltage applied to both armature leads, the pump motor 28 is at rest. Lack of flow causes ball check valves 64 in bores 56 and 58 to lose sealing action. Hydraulic pressure then equalizes throughout the actuator 10. As this occurs, valve assemblies 114, 116, 128 and 130 close, blocking fluid flow from either end of cylinder bore 26 causing rod 24 to be locked into place.

It will be clear that the present invention is well adapted to attain the ends and advantages mentioned as well as those inherent therein. While a presently preferred embodiment has been described for purposes of this disclosure, numerous changes may be made which will readily suggest themselves to one skilled in the art and which are encompassed in the spirit of the invention disclosed and as defined in the appended claims.

I claim:

1. A hydraulic actuator comprising:

a motor configured to operate in a selected one of a first and a second direction;

a pump assembly coupled to the motor, wherein the pump assembly is configured to pressurize hydraulic fluid;

a cylinder bore, wherein the cylinder bore has an upper chamber and a lower chamber separated by a movable piston member;

a first plurality of pressure actuated valves that regulate the flow of high pressure hydraulic fluid to the upper chamber and low pressure fluid from the lower chamber, wherein the first plurality of pressure actuated valves are actuated in response to pressure generated by the pump assembly when the motor is operated in the first direction;

a second plurality of pressure actuated valves that regulate the flow of high pressure hydraulic fluid to the lower chamber and low pressure fluid from the upper chamber, wherein the second plurality of pressure actuated valves are actuated in response to pressure generated by the pump assembly when the motor is operated in the second direction;

a reservoir configured to hold hydraulic fluid;

a pump vent; and a pump passageway, wherein the pump passageway is configured to transfer hydraulic fluid from the pump vent to the reservoir.

2. The hydraulic actuator of claim 1 wherein the hydraulic actuator further comprises:

an upper cylinder passageway configured to cooperate with the passive valve assembly of the first plurality of pressure actuated valves and the active valve assembly of the second plurality of pressure actuated valves to regulate the flow of hydraulic fluid to and from the upper chamber; and a lower cylinder passageway configured to cooperate with the active valve assembly of the first plurality of pressure actuated valves and the passive valve assembly of the second plurality of pressure actuated valves to regulate the flow of hydraulic fluid to and from the lower chamber.

3. The hydraulic actuator of claim 1 wherein the hydraulic actuator further comprises a plurality of ball check valves that regulate the flow of hydraulic fluid around the pump assembly.

4. A hydraulic actuator comprising:

a motor configured to operate in a first or second direction;

a pump assembly coupled to the motor, wherein the pump assembly is configured to pressurize hydraulic fluid;

a cylinder bore, wherein the cylinder bore has an upper chamber and a lower chamber separated by a movable piston member;

a rod attached to the piston member, wherein the rod is configured to extend or retract;

a first plurality of pressure actuated valves that are configured to extend the rod, wherein the first plurality of pressure actuated valves are actuated in response to pressure generated by the pump assembly when the motor is operating in the first direction;

a second plurality of pressure actuated valves that are configured to retract the rod, wherein the second plurality of pressure actuated valves are actuated in response to pressure generated by the pump assembly when the motor is operating in the second direction;

a reservoir configured to hold hydraulic fluid;

a pump vent; and a pump passageway, wherein the pump passageway is configured to transfer hydraulic fluid from the pump vent to the reservoir.

5. The hydraulic actuator of claim 4 wherein the hydraulic actuator is configured for attachment to the transom of a boat and wherein the rod is configured for attachment to a boat motor.

6. A hydraulic actuator comprising:

a motor;

a pump assembly coupled to the motor, wherein the pump assembly is configured to displace hydraulic fluid;

a cylinder bore, wherein the cylinder bore includes an upper and a lower chamber separated by a movable piston member;

passive valve means for controlling the flow of hydraulic fluid to the upper chamber or lower chamber;

active valve means for controlling the flow of hydraulic fluid from the upper chamber or lower chamber;

a reservoir configured to hold hydraulic fluid;

a pump vent; and a pump passageway, wherein the pump passageway is configured to transfer hydraulic fluid from the pump vent to the reservoir.

* * * * *